United States Patent [19]

Bugga et al.

[11] Patent Number: 4,966,823

[45] Date of Patent: Oct. 30, 1990

[54] ORGANIC CATHODE FOR A SECONDARY BATTERY

[75] Inventors: Ratnakumar V. Bugga, Arcadia; Salvador DiStefano, Alhambra; Roger M. Williams, Azusa; Clyde P. Bankston, Studio City, all of Calif.

[73] Assignee: The United States of America as represented by the Administrator of the National Aeronautics and Space Administration, Washington, D.C.

[21] Appl. No.: 404,288

[22] Filed: Sep. 7, 1989

[51] Int. Cl.$^5$ .................... H07M 10/39; H07M 4/60
[52] U.S. Cl. .................................. 429/104; 429/213; 252/62.2
[58] Field of Search ................ 252/62.2; 429/104, 213

[56] References Cited

U.S. PATENT DOCUMENTS 4,722,875 2/1988 Wright .............................. 429/183
4,833,048 5/1989 DeJongue et al. .................. 429/104

OTHER PUBLICATIONS

Fischer et al., Chemical Abstracts, v. 89, No. 8907, 1978.

Primary Examiner—Stephen J. Kalafut
Attorney, Agent, or Firm—Thomas H. Jones; John R. Manning

[57] ABSTRACT

A liquid catholyte for a battery based on liquid metal such as sodium anode and a solid, ceramic separator such as beta alumina (BASE) comprises a mixture of a Group I-III metal salt such as sodium tetrachloroaluminate and a minor amount of an organic carbonitrile depolarizer having at least one adjacent ethylenic bond such as 1 to 40 percent by weight of tetracyanoethylene. The tetracyanoethylene forms an adduct with the molten metal salt.

19 Claims, 3 Drawing Sheets

ORGANIC CATHODE FOR A SECONDARY BATTERY

ORIGIN OF THE INVENTION

The invention described herein was made in the performance of work under a NASA contract, and is subject to the provisions of Public Law 96-517 (35 USC 202) in which the Contractor has not elected to retain title.

Technical Field

The present invention relates to a secondary battery and, more particularly, this invention relates to a battery utilizing a molten metal anode and a liquid organic catholyte, such as a rechargeable sodium or lithium battery having high energy density and high power density

Background of the Invention

New types of energy sources are needed to power electronic devices, electric vehicles and to smooth peak power demands on electric utilities. Promising devices for electrochemical energy conversion are based on the use of a solid electrolyte separator such as ceramic, beta alumina solid electrolyte (BASE).

Two high power density, high energy density, high efficiency electrochemical power systems based on a liquid sodium anode (on discharge) and beta or beta"-alumina solid electrolyte (BASE) have been intensely studied. The alkali metal thermoelectric converter operates at a hot side temperature of 1000-1300K and is potentially the most efficient non-mechanical thermal to electric converter for this temperature range. The sodium-sulfur battery is an extremely high energy density secondary (rechargeable) battery operating at 600-700K.

Statement of Prior Art

Since the discovery in 1962 by Joseph Kummer and Neill Weber (1) that the material $\beta''$-alumina was a good sodium ion conductor, several studies were made on its use as a solid electrolyte separator in various battery systems with liquid sodium as anode. The interest for many years has been focused on sodium-sulfur battery (2) which has many attractive features such as high density (0.750 Wh/kg), high rate discharge capability permitted by a good (comparable to aqueous electrolytes) ionic conductivity of $\beta''$-alumina solid electrolyte (BASE) at high temperatures and long cycle life and shelf life. The cell operates typically at 350° C. and energy densities of 150 Wh/kg have been demonstrated in finished cells (3). However, there are certain difficulties associated with the use of sodium-sulfur batteries. In particular, due to the highly corrosive nature of sulfide melts, material selection for the current collector in the positive electrode is very critical and limited to a few possible choices, e.g., molybdenum, chromium, carbon and some super alloys (3). Also, there is a likelihood of BASE degrading in polysulfide melts (4). Further, the inherent violent reaction between liquid sodium and liquid sulfur demands a rather sophisticated design of the battery to circumvent the safety problem in the event of failure of the solid electrolyte ceramic.

Several alternate materials have been examined in the literature as positive electrodes, especially with chloroaluminate (mainly $AlCl_3$-NaCl melts) electrolytes. Interesting couples among these are Na-$SbCl_3$ (5), Na/$Cl_2$ (6), Na/$S_2Cl_2$ (7), etc. Mamantov and co-workers made a detailed study on NaS(IV) or $SCl_3^+$cells (8,9). These systems have attractive energy densities but are not free from corrosion problems. A new class of inorganic materials, i.e., transition metal dichlorides, is gaining increasing attention as solid rechargeable cathodes in sodium batteries (10-13). These systems can operate at lower temperatures $\geq 180°$ C.; the corrosion problems are proportionally less severe. The relatively sluggish kinetics of the chemical reaction between liquid sodium and catholyte reduces the safety problem considerably (14). Also, the molten electrolyte $NaAlCl_4$ remains invariant under normal discharge/charge, thus reducing polarization losses, localized current densities and failure therefrom. Carbonitriles with adjacent ethylenic double bonds exhibit ready reducibility at high reduction potentials and have been used as cathode depolarizers in primary batteries (15).

There has been no commercial exploitation of the sodium-sulfur high energy battery system despite over 22 years of development. The main deterrent factors are the corrosion of the positive electrode safety and the possible degradation of the BASE due to molten sulfur at the 600-700K operating temperature.

List of Cited References
1. J. T. Kummer and N. Weber, Proc. SAE Congr., 1967 Paper 670179.
2. J. L. Sudworth and A. R. Tilley, "The Sodium Sulphur Battery," Chapman and Hall Ltd., N. Y., 1985 and references therein.
3. R. P. Tischer, "The Sulphur Electrode," Academic Press, N.Y., 1983.
4. M. Liu, "Degradation of Sodium $\beta''$ Alumina Electrolyte in Contact with Sulfur/Sodium Polysulfide Melts," Lawrence Berkeley Laboratory, Report 1986 LBL-21563; see Energy Abstr, 1986, 11(32), Abst. No. 50849.
5. N. P. Yao and J. R. Selman, "Proc. Symp. Load Levelling," ECS, Princeton, N.J., 1977.
6. J. J. Werth, U.S. Pat. No. 3,847,667 (1974); U.S. Pat. No. 3,877,984 (1975).
7. J. J. Auborn and S. M. Granstaff, Jr., J. Energy, 6 (1982), 86-90.
8. G. Mamantov, R. Marassi, M. Matsunga, Y. Ogata, J. P. Wiaux and E. J. Frazer, J. Electrochem. Soc., 127, 2319 (1980).
9. G. Mamantov, "Rechargeable High-Voltage Low-Temperature Molten-Salt Cell Na/$\beta''$ Alumina/$SCl_3^+$in $AlCl_3$-NaCl." Final report for Lawrence Berkeley Laboratory, LBL-21653, December 1985.
10. J. Coetzer, R. J. Bones, R. C. Galloway, D. A. Teagle and P. T. Moseley, U.S. Pat. No. 4,546,055 (1985).
11. J. Coetzer, J. Power Sources, 18, 377 (1986).
12. R. C. Galloway, J. Electrochem. Soc., 134, 256 (1987).
13. R. J. Bones, J. Coetzer, R. C. Galloway and D. A. Teagle, J. Electrochem. Soc , 134, 2379 (1987).
14. R. J. Wedlake, A. R. Tilley and D. A. Teagle, Bull. Electrochem., 4, 41 (1988).
15. W. R. Wolfe, Jr., U.S. Pat. No. 3,081,204, 1963.
16. K. J. Vetter, "Electrochemical Kinetics," Academic Press, 1967, Ch. 2.
17. S. J. Visco and L. C. DeJonghe, J. Electrochem. Soc.. 135, 2905 (1988).

Statement of the Invention

An improved high energy density battery system based on molten sodium and a solid, ceramic electrolyte are provided by the present invention. The battery system of the invention does not cause corrosion of the separator. The battery system exhibits high energy density over a wide range of temperatures including temperatures as low as 180° C. without buildup of pressure. The cells of the invention demonstrate higher rates and higher rechargeability than secondary cells employing intercalatable cathodes.

The battery system of the invention is similar to the sodium-sulfur system except that it does not use molten sulfur. The battery system of the invention uses a liquid cathode including a reversible, organic electron acceptor. Usually the catholyte includes an organic electron acceptor and a molten sodium salt. The catholyte of the invention does not corrode the solid electrolyte separator. The liquid cathode results in higher power densities and provides longer life for the system. In addition, electrode fabrication is easier and is less costly.

Cells fabricated with the liquid cathode of the invention demonstrate high power density and stability. No degradation of the solid separator or of the cathode materials was observed. Long term operation is promising.

The battery system of the invention could be important to future space exploration. Present designs include a solar array of recharged Ni-Cd batteries as the best high energy density, high power, high cycle life secondary battery system. Ni-Cd batteries are heavy. They usually make-up about one-half of the power system weight. The battery system of this invention could reduce the weight by a factor of ~5 compared to Ni-Cd batteries. Since the battery system of the invention operates at temperatures of about 100 degrees lower than the sodium-sulfur battery, the thermal control requirements are both cheaper, safer and weigh less.

DETAILED DESCRIPTION OF THE INVENTION

Figure 1:
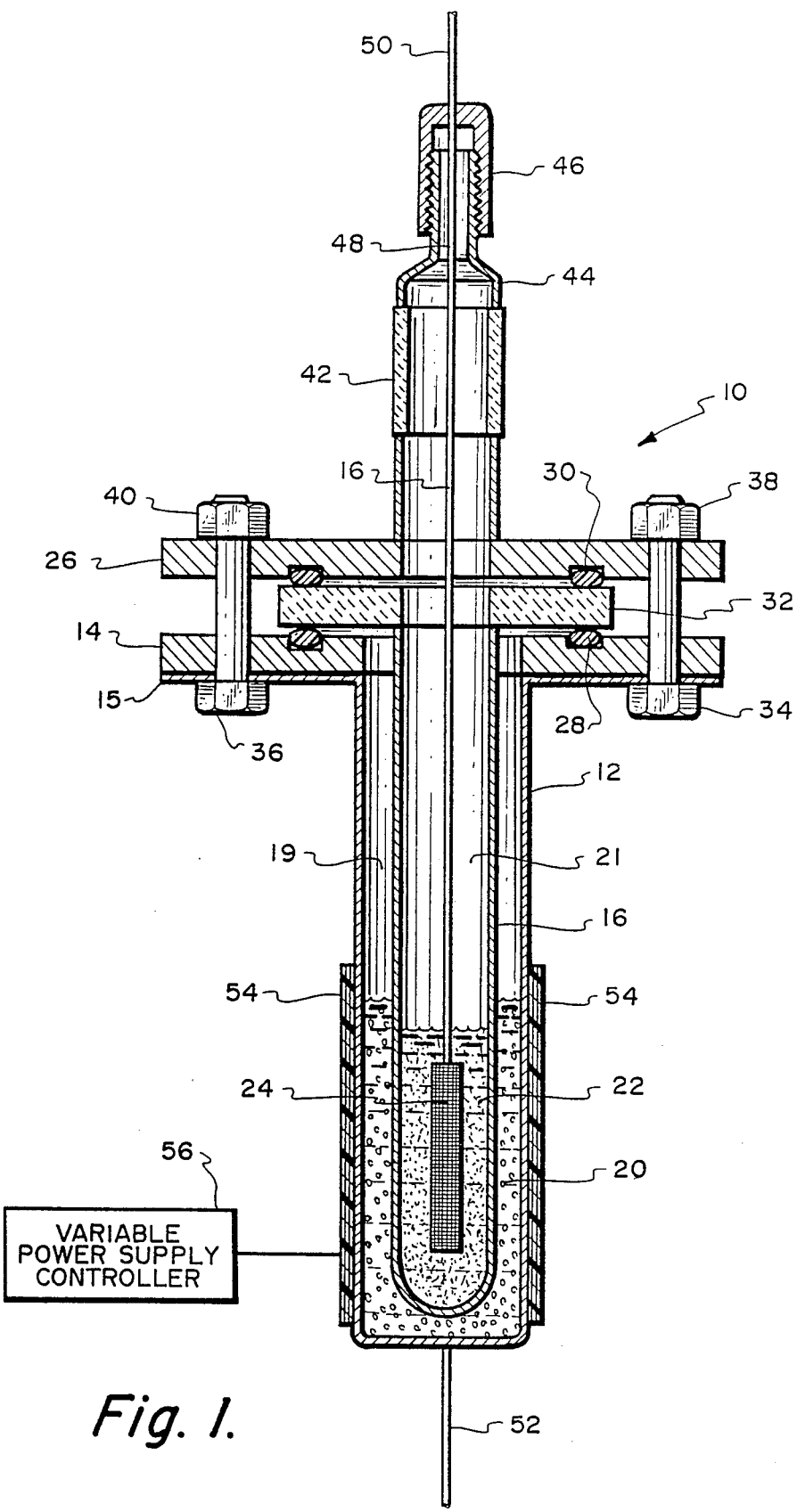
FIG. 1 is a schematic view of a battery in accordance with the invention.

The battery of the invention is based on a body of molten metal anode, solid ionic ceramic separator and a liquid organic cathode in a molten salt. An anode current collector is in contact with the body of molten sodium and a cathode current collector is in contact with the catholyte. The anode current collector can take the form of a cylindrical or U-shaped metal tube such as stainless steel and the cathode current collector can be an element such as a noble metal or graphite suspended in the body of liquid catholyte.

The battery configuration can be represented as follows:

| Anode | Liquid | Solid | | Cathode |
|---|---|---|---|---|

| Current Collector | Anode | Electrolyte Separator | Catholyte | Current Collector |
|---|---|---|---|---|

The liquid anode is a Group I metal preferably sodium, potassium or lithium or alloys thereof such as NaK. The solid electrolyte is preferably a thin film of beta alumina. The solid electrolyte is chose to be an ion conductor for the ion of the liquid anode. For example, one could choose β-alumina to conduct sodium from a liquid sodium anode. Beta-alumina and beta"-alumina or their mixtures are members of the class of materials known as solid electrolytes or fast ion conductors. These materials have ionic conductivities much larger than their electronic conductivities and thus act as electrolyte as well as separator. Beta"-alumina solid electrolyte (BASE) has a much higher sodium conductivity than Beta-alumina and is a transparent crystalline solid melting at 2253K, having the nominal composition Na$_{5/3}$Li$_{1/3}$Al$_{32/3}$O$_{17}$ and is usually fabricated as a dense microcrystalline sintered ceramic. It is inert to reaction with elemental sodium at temperatures as high as 1300K. Its Na$^+$ conductivity at 300° C. is 0.2-0.4 ohm$^{-1}$cm$^{-1}$.

The solid electrolyte can assume different configurations such as a flat barrier film or the solid electrolyte can be provided in cylindrical form. The surface can be planar or corrugated. The solid electrolyte is usually utilizes a fairly thin film, typically having a thickness from 0.01 to 0.2 cm, generally around 0.1 cm.

The liquid catholyte comprises a mixture of salts of Group I and Group III metals which is molten at the operating temperature of the battery containing from 1 to 40 percent by weight, of an organic carbonitrile preferably having at least one adjacent ethylenic bond. Such materials are highly reversible electron acceptors. Representative organic electron acceptor materials are cyanogen, tetracyanoethylene (TCNE), tetrocyanoquinodimethane (TCNQ) and chrysene tetrafluoroborate. Instead of a fused salt one can use an aprotic solvent such as sulfolane in the catholyte.

The molten salt is preferably a Group I metal salt and can be a mixture of Group I and Group III metal salt such as a sodium tetrachloroaluminate (NaAlCl$_4$) The molten salt is preferably maintained basic. The ratio of NaAl:AlCl$_3$ is preferably 1/1. There is evidence that the organic charge transfer material such as TCNE forms a monomeric or polymeric adduct in the molten salt.

Referring to FIG. 1, a battery cell 10 comprises an outer cylindrical tube 12 having a flange 14, suitably formed of a conductive, corrosion resistant metal such as stainless steel. A BASE tube 16 is supported within the outer tube 12 forming an annular chamber 19 between the outer tube 12 and the BASE tube 16 for receiving body 20 of liquid anode such as sodium. A second chamber 21 is formed within the BASE tube 16 for receiving a second body 22 of liquid catholyte. A current collector 24 such as a graphite mesh or a tube of platinum is immersed within the body 22 of catholyte.

A flange 26 is connected to the BASE tube 22 above and parallel to the flange 14. A ceramic spacer, insulator 32 such as alumina is disposed between the o-rings 28, 30. The interior opposed surfaces of the flanges 14, 26 and ceramic header 32 are grooved to receive o-rings 28, 30. The annular space 18 is sealed by the means of threaded connectors 34, 36 received through apertures in the flanges 14, 26 and tightened by means of nuts 38, 40. A ceramic insulator sleeve 42 can be provided on the upper neck 44 of the BASE tube 16. The top of the tube 16 can also be sealed with a cap 46 which sealingly receives the lead 48 connecting the current collector 24 to the positive terminal 50. The negative terminal 52 is connected to the outer tube 12. A heater tape 54 can be wrapped around the outer tube. The heater is connected to a variable power supply, controller 56.

A test apparatus was constructed according to the design of FIG. 1 and was operated to test and prove the system. The BASE tube 16 separates the liquid anode and catholyte and is supported by an α alumina header 14 resting on the metallic flange 15 of the outer stainless steel tube. Inside the BASE tube is the mixture of molten electrolyte, $NaAlCl_4$, and cathodic depolarizer TCNE into which is immersed either a platinum graphite foil to act as the positive current collector. The top metallic half is bolted onto the metallic flange of the bottom portion with an aluminum o-ring placed between the plates. It is thus possible, in principle, to seal the anode (liquid sodium) half cell from the atmosphere, permitting the cell to be operated outside the glove box. The positive lead is connected to a metallic cap threaded onto the top lid. A ceramic ring in the top lid prevents shorting between the metallic cap (positive terminal) at the top, and the bottom metallic half (negative terminal). The cell is heated up electrically by a heating tape wound around the bottom stainless tube and its temperature monitored with a thermocouple in contact with the bottom stainless steel tube.

All the chemicals, TCNE, $NaAlCl_4$ as well as sodium were of analytical grade and were used as received. All the cell fabrication operations were carried out in an argonfilled glove box with oxygen concentration less than 10 ppm. $\beta''$-alumina ceramic was cleaned by etching in hot phosphoric acid.

The electrochemical cell employed for the following studies constitutes liquid sodium anode/$\beta''$-alumina solid electrolyte/sodium tetrachloroaluminate molten electrolyte containing 10% by weight TCNE cathode depolarizer and a platinum or carbon foil current collector. The cell is typically operated at 230° C.

The cyclic voltammogramas of TCNE in a two electrode Na-TCNE cell at different scan rates show a reduction peak around 3.0 V vs. $Na^+/Na$ and the conjugate oxidation peak around 3.8 V vs. $Na_+/Na$. The Na-TCNE cell could thus be operated between the voltage limits of 2.0 and 4.0 V. In this voltage range, the molten electrolyte is stable. At potentials <2.0 V, aluminum deposition takes place and at potentials exceeding 4.0 V chlorine evolves. As the scan rate is reduced, the cell current exhibits a plaueau suggesting that mass transfer processes are governing the kinetics of TCNE reduction. This is confirmed by a plot of peak current against the square root of scan rate, which is linear as may be expected in diffusion-governed kinetics.

Discharge/Charge Characteristics

Figure 2:
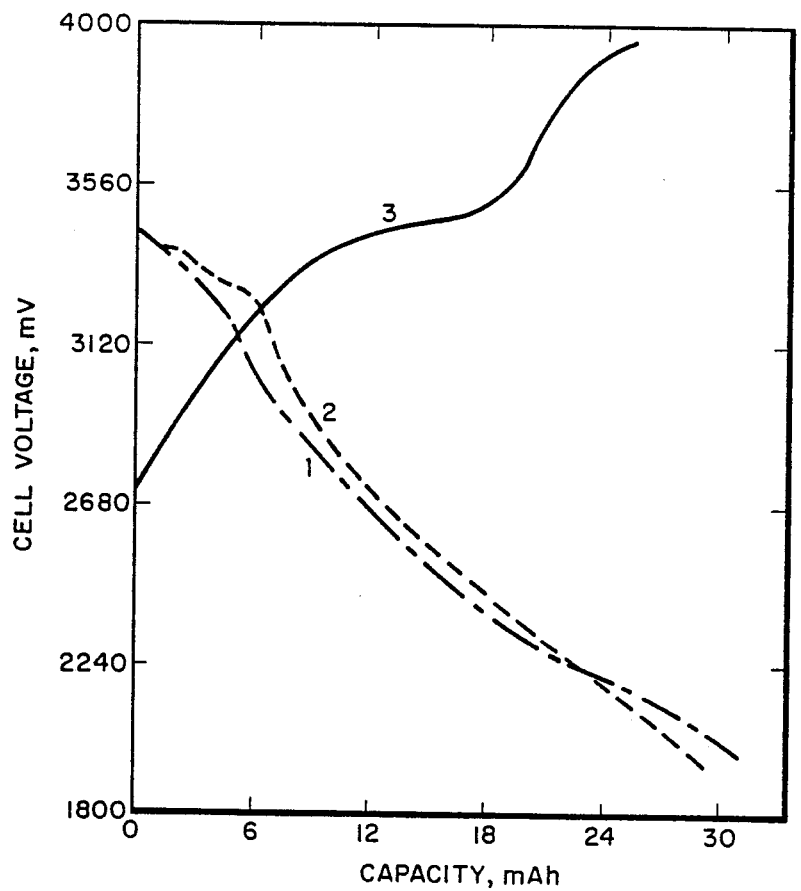
FIG. 2 is a set of voltage versus capacity curves of a 45 mAh Na/BASE/NaAlCl$_4$, TCNE (10 W%)/Pt cell during discharge in (1) third cycle, (2) fourth cycle, and (3) during charging at 6 mA (1 ma/cm$^2$) at 230° C.

The discharge/charge behavior of TCNE and its reversibility are illustrated by the set of voltage-time curves during galvanostatic polarization at 1 $mA/cm^2$ (FIG. 2). TCNE has a wide voltage range from 3.6 V to ~2.0 V during discharge and from ~2.7 V to 4.0 V during charge. The discharge (as well as charging) curve of TCNE is sloping as may be expected in a single-phase redox reaction involving soluble species. The equilibrium potential of TCNE also varies in a similar fashion with depth of discharge. It is therefore possible to estimate the state of charge of TCNE either from the equilibrium potential or the discharge potential.

The amp. hour capacity delivered by the 45 mAh, positive-limited Na-TCNE cell with a TCNE concentration of 10 W% in $NaAlCl_4$ is ~30 mAh which corresponds to a coulombic yield of ~65% at 1 $mA/cm^2$. The reversibility of TCNE is demonstrated by the discharge curves 1 and 2 in FIG. 2 which gave the same capacity in successive discharges.

Na-TCNE Cell With Different TCNE Concentrations

Since the molten electrolyte $NaAlCl_4$ acts as a supporting electrolyte and would not contribute to the energy density of the battery, it is imperative that the concentration of TCNE in $NaAlCl_4$ needs to be increased to achieve higher energy densities. Cells with different concentrations of TCNE in the catholyte were therefore constructed and studied to characterize discharge performance as well as electrochemical kinetics.

A coulombic yield of 67% was obtained on a platinum foil electrode and ~60% was realized on a carbon electrode at 1 $mA/cm^2$ in catholytes containing 10 W% of TCNE in $NaAlCl_4$. At higher concentrations of TCNE, e.g., at 25%, the same coulombic yield was realized but at lower current density (0.25 $mA/cm^2$). At a c.d. of 1.5 $mA/cm^2$, the coulombic yield decreased to 40%. It is thus clear that with increasing amounts of TCNE in the catholyte, the current efficiency for TCNE reduction drops. One needs to have a trade off between the (built in) energy density and the utilization efficiency or power capability in a TCNE battery.

Potentiodynamic polarization curves at higher concentrations of TCNE in the catholyte explain the poor current efficiency of TCNE with increasing TCNE concentration. The current-potential curves show a strong influence of mass transfer process in the Tafel regime at a TCNE concentration of 10 W% in $NaAlCl_4$. At higher TCNE concentrations, however, the charge transfer kinetics become relatively sluggish as evidenced by increasing linearity in the Tafel regime. The kinetic parameters obtained from the corrected Tafel plots also reflect the sluggish kinetics of TCNE reduction (Table 1).

TABLE 1

Electrochemical kinetic parameters obtained from various ac and dc measurements for the reduction of TCNE in Na/BASE/$NaAlCl_4$, TCNE/Pt or e at 230° C. with different concentrations of TCNE in the catholyte.

| SYSTEM | CONCEN-TRATION W % | CELL CAPACITY (CATHODE LIMITED mAh) | COULOMBIC YIELD | AC IMPEDANCE DATA | | | | DC POLARIZATION DATA | | |
|---|---|---|---|---|---|---|---|---|---|---|
| | | | | CELL RESISTANCE ohms $cm^2$ | EXCHANGE c.d. $mA/cm^2$ | DIFFUSION COEFFICIENT | | LINEAR | TAFEL | |
| | | | | | | $\sigma$ $\Omega$ $cm^2/s^{\frac{1}{2}}$ | D $cm^2/s$ | $I_o$ $mA/cm^2$ | $I_o$ $mA/cm^2$ | $\alpha$ |
| TCNE Pt @ 230° C. | 10% | 45 | 67% @ 1 $mA/cm^2$ | 22.8 | 1.81 | 13.5 | $1.0 \times 1.0^{-9}$ | — | 0.49 | 0.17 |
| | 37% | 150 | — | 80.9 | 0.53 | 24.0 | $1.9 \times$ | 0.075 | 0.06 | 0.24 |

TABLE 1-continued

Electrochemical kinetic parameters obtained from various ac and dc measurements for the reduction of TCNE in Na/BASE/NaAlCl$_4$, TCNE/Pt or e at 230° C. with different concentrations of TCNE in the catholyte.

| SYSTEM | CONCEN-TRATION W % | CELL CAPACITY (CATHODE LIMITED mAh) | COULOM-BIC YIELD | AC IMPEDANCE DATA | | | | DC POLARIZATION DATA | | |
|---|---|---|---|---|---|---|---|---|---|---|
| | | | | CELL RESIS-TANCE ohms cm$^2$ | EXCHANGE c.d. mA/cm$^2$ | DIFFUSION COEFFICIENT | | LINEAR | TAFEL | |
| | | | | | | $\sigma$ $\Omega$ cm$^2$/s$^{\frac{1}{2}}$ | D cm$^2$/s | $I_o$ mA/cm$^2$ | $I_o$ mA/cm$^2$ | $\alpha$ |
| C | 10% | 60 | 60% @ 1 mA/cm$^2$ | 29.4 | 3.3 | 4.8 | $7.1 \times 10^{-9}$ | 0.87 | 0.65 | 0.51 |
| | 25% | 25 | 60% @ 0.25 mA/cm$^2$ 40% @ 1.5 mA/cm$^2$ | 48.7 | 2.9 | 36.3 | $2.0 \times 10^{-11}$ | 0.12 | 0.115 | 0.33 |

The exchange current density decreases by six and eight times as the concentration is increased to 25 W% and 37 W%, respectively. A similar trend is observed in the values of exchange current densities obtained from the linear polarization method at different TCNE concentrations (Table 1).

The ac impedance data indicate higher impedance of the cell with increased amounts of TCNE in the catholyte. The series resistance, which has significant contribution from the catholyte, is 2-6 times higher as the TCNE concentration is increased to 25-37 W% which may be expected from the poor conductivity of TCNE. The kinetic parameters, especially the exchange current density, show the same trend as those obtained from dc methods, i.e., the kinetics of TCNE reduction becoming sluggish at higher TCNE concentrations. The actual values of kinetic parameters obtained by ac methods are, however, about 4-5 times higher than the corresponding values from dc methods. This may be ascribed to the polarization losses (ohmic and concentration) not being properly compensated or corrected for in the dc methods. The diffusion coefficients of TCNE in the catholyte calculated from ac impedance data suggest a reduced mobility for TCNE in TCNE-rich catholytes. The diffusion coefficient decreases by two orders of magnitude as the concentration is raised to 25-37 W% and is of the order of $10^{-11}$ cm$^2$/s. The lower diffusion coefficients may be responsible for the concentration polarization and hence for lower current efficiencies at higher TCNE concentrations.

It is thus clear from the ac and dc measurements with different TCNE concentrations that the reduction of TCNE is kinetically hindered by increase in ohmic, concentration as well as charge transfer polarization losses at higher TCNE concentrations in the catholyte.

Thermal Instability of TCNE

At the temperatures of operation, i.e., around 230° C., TCNE undergoes an irreversible transformation forming a black adduct. This adduct of TCNE does not melt at these temperatures. The kinetic hindrance to the reduction of TCNE observed in ac and dc studies could be related to this transformation of TCNE. The higher the amount of TCNE in the catholyte, the more viscous and resistive the catholyte becomes, resulting in higher polarization losses. TCNE is known to undergo a thermal reaction by itself, though the presence of NaAlCl$_4$ might accelerate the transformation process. Even in a non-aqueous electrolyte, sulfolane/sodium tetrafluoro borate used in place of NaAlCl$_4$ in earlier studies, a similar phenomenon was observed at 150°-200° C. Nevertheless, it is of interest to note that in the present case the electrochemical activity, at least corresponding to one electron per mole of TCNE, as well as electrochemical reversibility are still retained in TCNE even after transformation thus permitting it to be used as a rechargeable cathode material.

Figure 3:
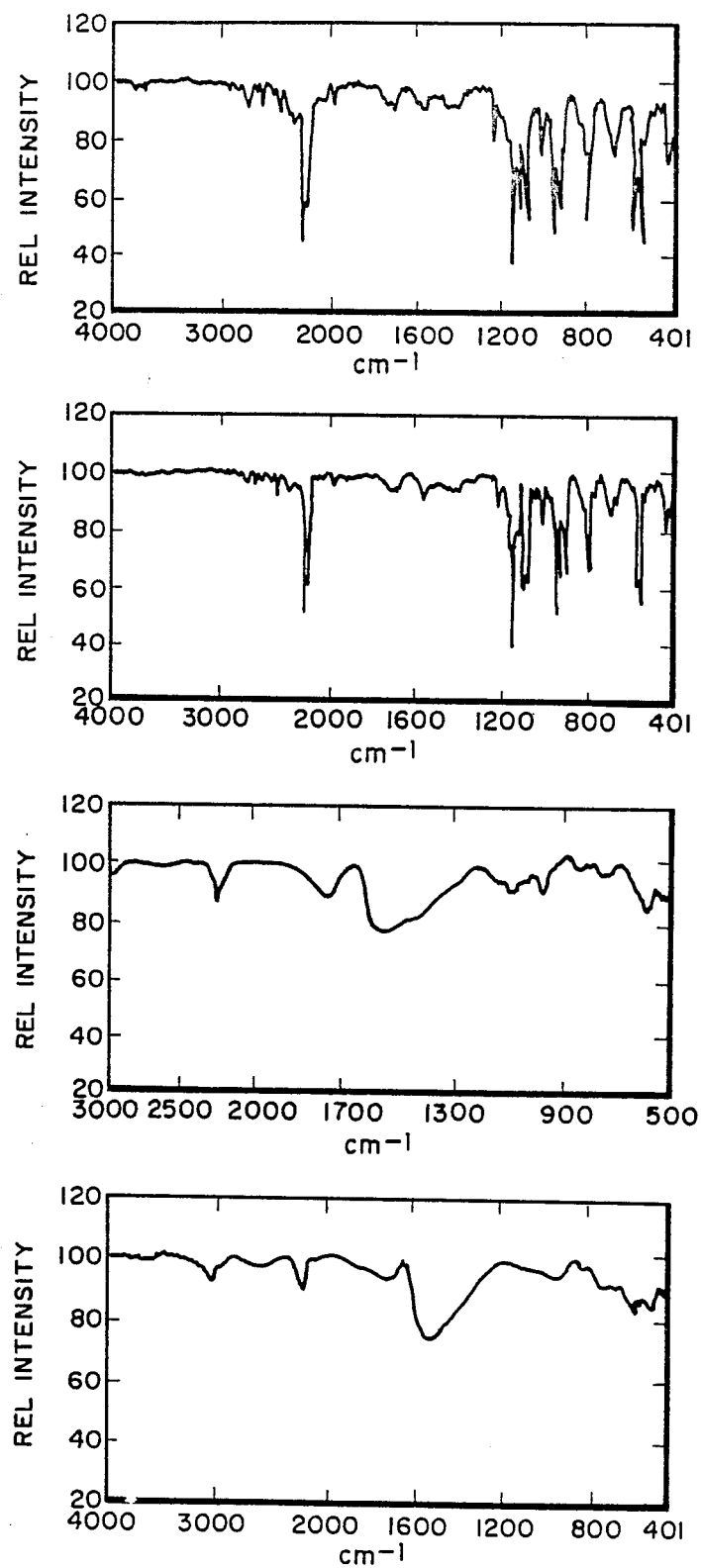
FIG. 3 are FTIR spectra of TCNE under various experimental conditions (a) reference, (b) heated, (c) heated together with NaAlCl$_4$, TCNE/Pt cell.

In order to understand the mechanism of the transformation, FTIR spectral studies were carried out on TCNE at various stages, i.e., fresh TCNE, TCNE heated, a mixture of TCNE and NaAlCl$_4$ after heating, and a mixture of TCNE and NaAlCl$_4$ after heating and electrochemical reduction (discharge) (FIG. 3). The spectra were obtained on powdered samples in the diffuse reflectance mode. There appears to be no change in the FTIR spectrum of TCNE as a result of heating by itself, though physically the transformation seems to have occurred The peaks around 2200-2300 cm$^{-1}$ assigned to C≡N as well as those around 800-1000 cm$^{-1}$ attributed C═C are equally strong in the heated TCNE also (FIGS. 3A and 3B). The fine structure of TCNE is thus retained even after heating. However, there is considerable change in the spectral response after heating TCNE with NaAlCl$_4$. The sharp peaks around 2200-2300 are replaced by a single broad, less intense peak. Also, the multiple signals around 800-1000 cm$^{-1}$ corresponding to ethylene bonds are conspicuously absent. Instead, a new broad peak around 1500 emerged in the TCNE heated with NaAlCl$_4$ (FIG. 3C). This may be assigned to the R-C═N-group with a characteristic peak around 1689-1487 cm$^{-1}$ which might be present in the transformation product as a result of reduction of a cyanide group in TCNE. The spectrum of TCNE heated with NaAlCl$_4$ remains the same after a nearly complete (~70%) electrochemical reduction (FIG. 3D).

From the above observations, it can be concluded that the transformation of TCNE at high temperatures is assisted by the presence of NaAlCl$_4$. The transformation is a result of a chemical reaction evidenced by a loss of fine structure in the I.R. bands due to C≡N and C═C bonds and emergence of a new peak due to partial reduction of the cyanide functional group. Nevertheless, the functional group responsible for the electrochemical activity is still available for reaction as evidenced by the spontaneous reduction occurring at the potentials corresponding to TCNE. However, there is a high degree of kinetic hindrance to the reduction, possibly due to the stearic hindrance posed by the transformation product. Combining these facts with the well known tendency of TCNE to polymerize thermally and more favorably in the presence of donors, it is reasonable to conclude that there is a "polymerization" occurring in TCNe under the experimental conditions due to which its physical properties are altered, but the electrochemical behavior remains similar.

The present invention indicates that batteries containing a TCNE sodium aluminate cathode are useful in low to medium power applications. Finally, it may be possible to use other stable high energy density organic materials in the battery of the invention e.g., Na(1)-/BASE/molten electrolyte+depolarizer/current collector or TCNE in ambient temperature, non-aqueous electrolyte lithium batteries to achieve high energy densities at power densities comparable to the present practical systems.

It is to be realized that only preferred embodiments of the invention have been described and that numerous substitutions, modifications and alterations are permissible without departing from the spirit and scope of the invention as defined in the following claims.

We claim:

1. A battery system comprising in combination:
   a first body of liquid meal anode comprising a Group I metal;
   a record body of liquid cathode comprising a combination of a Group I metal salt and a Group III metal salt molten at the temperature of operation of the battery containing a minor amount of an organic carbonitrile depolarizer containing at least one adjacent ethylenic bond.

2. A battery system according to claim 1 in which the separator comprises alumina.

3. A battery system according to claim 2 in which the separator comprises beta" alumina.

4. A battery system according to claim 1 in which the organic depolarizer is present in the second body in an amount from 1 to 40 percent by weight.

5. A battery system according to claim 1 in which the organic depolarizer is tetracyanoethylene.

6. A battery system according to claim 5 in which the metal is sodium.

7. A battery system according to claim 6 in which the metal salt is a sodium tetrachloraluminate.

8. A battery system according to claim 1 in which a first chamber for receiving the first body is formed between said first current collector and said ceramic separator.

9. A battery system according to claim 8 in which a second chamber for receiving the second body is formed by disposing a hollow tube of said separator within said first body.

10. A battery system according to claim 8 further including vapor-tight means for closing the first chamber.

11. A battery system according to claim 9 further including vapor-tight second means for closing the second chamber.

12. A battery system according to claim 1 further including means for heating the first and second bodies to a temperature at which both of said bodies are molten.

13. An electrolyte for a battery comprising a mixture of a Group I metal salt and a Group III metal salt containing a minor amount of an organic carbonitrile depolarizer containing at least one adjacent ethylenic bond.

14. An electrolyte according to claim 13 in which the organic depolarizer is tetracyanoethylene.

15. An electrolyte according to claim 14 in which the organic depolarizer is present in an amount from 1 to 40 percent by weight.

16. An electrolyte according to claim 15 in which the metal salt is a sodium tetrachloroaluminate.

17. A novel composition of catholyte melt comprising an adduct of a molten Group I—Group III metal salt and a carbonitrile having at least one adjacent ethylenic bond.

18. A composition according to claim 17 in which the salt is a sodium chloride—aluminum chloride salt and the carbonitrile is tetracyanoethylene.

19. A composition according to claim 18 in which the carbonitrile forms a polymeric adduct.

* * * * *